(12) United States Patent
Burgess

(10) Patent No.: US 10,107,329 B2
(45) Date of Patent: Oct. 23, 2018

(54) MODULAR STRUCTURAL COMPONENT

(75) Inventor: James Burgess, Leicester (GB)

(73) Assignee: CURVOMATIC LIMITED, Leicester (GB)

( * ) Notice: Subject to any disclaimer, the term of this patent is extended or adjusted under 35 U.S.C. 154(b) by 419 days.

(21) Appl. No.: 14/002,769

(22) PCT Filed: Mar. 2, 2012

(86) PCT No.: PCT/GB2012/050476
§ 371 (c)(1),
(2), (4) Date: Sep. 3, 2013

(87) PCT Pub. No.: WO2012/117258
PCT Pub. Date: Sep. 7, 2012

(65) Prior Publication Data
US 2013/0336708 A1    Dec. 19, 2013

(30) Foreign Application Priority Data

Mar. 2, 2011 (GB) .................................. 1103533.4
Mar. 2, 2012 (GB) .................................. 1203680.2

(51) Int. Cl.
*F16B 17/00* (2006.01)
*F16C 11/06* (2006.01)
(Continued)

(52) U.S. Cl.
CPC ............ *F16C 11/06* (2013.01); *E04G 11/062* (2013.01); *E06B 9/15* (2013.01); *F16B 17/00* (2013.01);
(Continued)

(58) Field of Classification Search
CPC ........ F16C 11/06; F16B 17/00; E04G 11/062; E06B 9/15; E06B 2009/1544; Y10T 403/7039; Y10T 403/32631
See application file for complete search history.

(56) References Cited

U.S. PATENT DOCUMENTS

| | | | | |
|---|---|---|---|---|
| 6,631,850 B1* | 10/2003 | Wa | ........................ | A63H 18/021 |
| | | | | 104/60 |
| 7,250,027 B2* | 7/2007 | Barry | ................... | A61B 1/0056 |
| | | | | 600/139 |
| 7,328,613 B2* | 2/2008 | Volkel | ...................... | E06B 9/15 |
| | | | | 160/232 |

FOREIGN PATENT DOCUMENTS

| | | |
|---|---|---|
| DE | 2209187 | 8/1973 |
| DE | 3031803 | 4/1982 |

(Continued)

OTHER PUBLICATIONS

International Search Report for PCT/GB2012/050476 dated Oct. 23, 2012.

(Continued)

*Primary Examiner* — Matthieu F Setliff
(74) *Attorney, Agent, or Firm* — Fleit Gibbons Gutman Bongini & Bianco PL; Paul D. Bianco; Gary S. Winer

(57) ABSTRACT

A modular component including an elongate hollow body having first and second attaching elements for attaching the modular component to another modular component. The first attaching element is in the form of cylindrical shaped spigot extending along an external surface of a first side wall of the body. The second attaching element is in the form of socket extending along an external surface of a second side wall of the body directly opposite the spigot. The socket has an internal shape that is sized and of a complementary shape of the spigot for receiving a spigot of another modular component. The socket is connected to the spigot by one or more bracing members that extend in a direction from the first side towards the second side between the spigot and the socket.

20 Claims, 5 Drawing Sheets

(51) Int. Cl.
*E04G 11/06* (2006.01)
*E06B 9/15* (2006.01)

(52) U.S. Cl.
CPC ... *E06B 2009/1544* (2013.01); *F16B 2200/10* (2018.08); *Y10T 403/32631* (2015.01); *Y10T 403/7039* (2015.01)

(56) References Cited

FOREIGN PATENT DOCUMENTS

| DE | 87 09 443 | | 8/1987 | | |
| EP | 0229178 | | 1/1989 | | |
| EP | 0299178 B1 | * | 10/1990 | .............. | E06B 9/15 |
| EP | 0 635 620 | | 1/1995 | | |
| EP | 0669444 | | 8/1995 | | |
| FR | 1530680 A | * | 6/1968 | .............. | E06B 9/15 |
| FR | 2264937 | | 10/1975 | | |
| FR | 2737751 | | 2/1997 | | |
| GB | 1103533 | | 2/1968 | | |
| WO | 01/36777 | | 5/2001 | | |
| WO | 2006042609 | | 4/2006 | | |

OTHER PUBLICATIONS

Examination Report dated Mar. 24, 2016 for related GB Application No. GB1317416.4.
Great Britain Search Report for GB1103533.4, dated Jul. 4, 2011.
Response to GB Examination Report, dated Jul. 25, 2016, for GB1317416.4.
Chinese Office Action for CN201280019858.1, dated Apr. 14, 2016.
Written Opinion and International Preliminary Report on Patentability for PCT/GB2012/050476 dated Sep. 3, 2013.
Chinese Office Action dated Dec. 5, 2016 for Chinese patent application No. 201280019858.1.
English translation of Chinese Office Action dated Dec. 5, 2016 for Chinese patent application No. 201280019858.1.

* cited by examiner

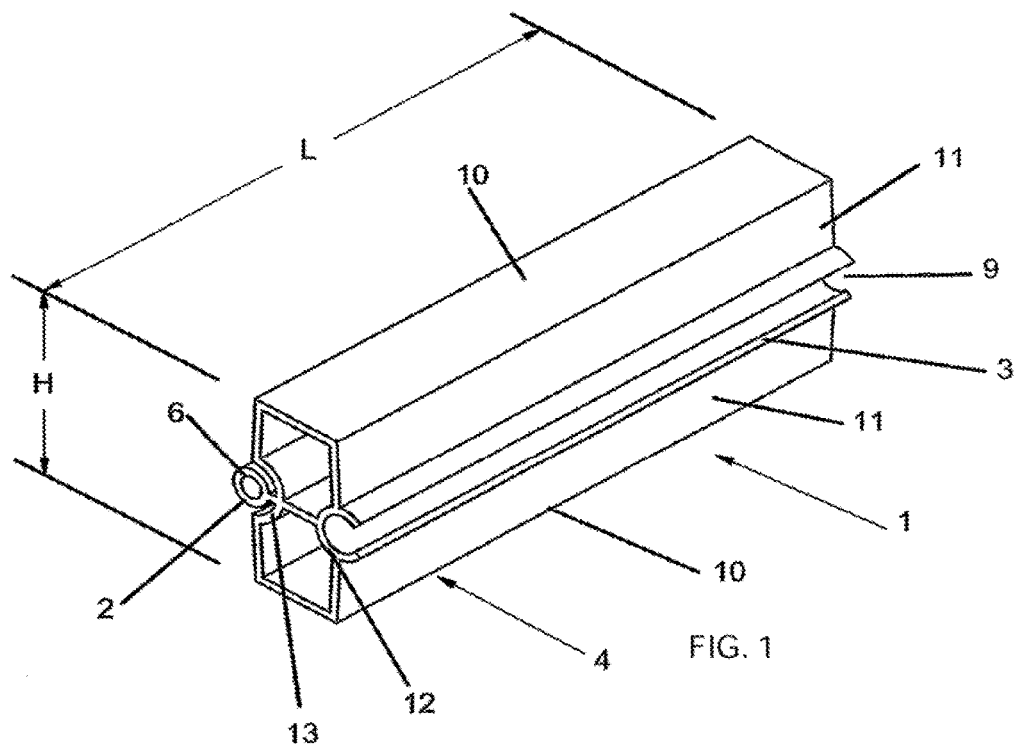
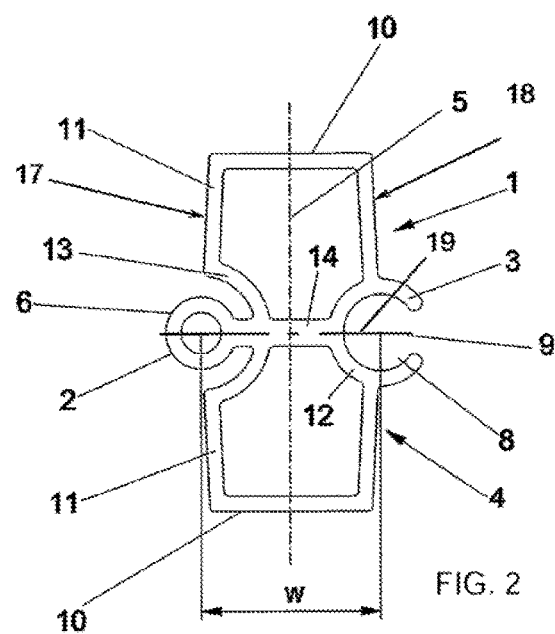

MODULAR STRUCTURAL COMPONENT

FIELD OF THE INVENTION

This application is the U.S. national phase of International Application No. PCT/GB2012/050476 filed 2 Mar. 2012 which designated the U.S. and claims priority to GB 1103533.4 filed 2 Mar. 2011, and GB 1203680.2 filed 2 Mar. 2012, the entire contents of each of which are hereby incorporated by reference.

This invention relates to modular structural components, and in particular to modular structural components that can be used with like components as curved structural products or as curved formers or templates for manufacturing curved components. A plurality of modular components according to the present invention can be used to create a surface that is gently curved in a first and/or a second direction and substantially linear in a direction that is perpendicular to the first and or second direction.

The co-pending British Patent Application No GB 1103533.4 describes such modular components, and is incorporated by reference in this application.

BACKGROUND OF THE INVENTION

It is often necessary or desirable to provide a curved surface. In relation to the present invention, curved surfaces are understood to be surfaces that are curved in a first or second direction but are substantially linear in a direction that extends perpendicular to the first or second direction. Curved surfaces are often required when constructing furniture or buildings. There are many other applications where the provision of a curved surface is necessary or desirable, for example, when casting concrete, vacuum forming plastics, forming thermoplastics into curves and when forming curved sections of glass fibre or fibre reinforced plastics or carbon fibre.

In furniture and in the design of buildings, the curved surfaces are often vertical surfaces and these surfaces are generally curved along a horizontal direction. However the present invention is not limited to vertical and or horizontal curved surfaces. Indeed, the invention could be applied to generally planar surfaces that have undulating or wavy surfaces. Curved surfaces used in the construction of furniture or buildings can either form part of the construction themselves, or can be used as templates for forming curved surfaces out of other materials. For example, when forming wooden furniture with curved surfaces it is necessary to have a template or former that defines a resilient substantially rigid curved surface of the correct shape in order to form the wood of the furniture to the correct shape.

Currently, most curved templates, formers, or moulds are formed of conventional materials and machined or otherwise shaped in a bespoke manner. For example, if a curved surface is needed for forming wooden furniture then a surface of the correct shape may be cut from a suitable material. As the surface will be specific to the curve required for the specific piece of furniture being constructed it cannot be used for any other surfaces. This may mean that the template, former or mould can only be used for a specific shape and thrown away after use when no longer required. Therefore, this method of forming templates, formers, or moulds for curved wooden furniture is relatively expensive and wasteful.

Modular components such as those described in EP1802841 (Reau Ag & CO), DE3031803 (Adolf Seuster GmbH), WO01/36777 (Reau Ag & C0), EP0669444 (Legerais), FR2264937 (Praquin), DE2209187 (Reipe Werk) and FR2737751 (Exten Plast), are designed for such uses as roller shutter doors, or roller shutter curtains, or for use as fences, or the like, but none of these documents disclose structurally rigid modular components that can be used in the manner proposed by the present invention.

BRIEF SUMMARY OF THE INVENTION

An object of the present invention in one embodiment is to provide a structural component that has first and second attaching means to enable the component to be connected to identical modular components to define a self supported structure.

A further object of the present invention in is to provide a modular structural component that is structurally rigid and light weight that has first and second attaching means to enable the component to be connected to identical modular components to define a template, former or mould for making other shaped articles or materials.

An important aspect of the present invention is that the modular component is constructed as a hollow box-like structure that has a bracing means between the first and second attaching mean.

In light of the above, there is a need for a former for forming a curved profile using modular components that is quick, easy to use and is cheap to manufacture. Preferably the curved profile that is formed should be able to be modified to form different curves whilst being resilient and rigid enough to be used either as a structural component or as a template or mould upon which other curved articles or materials can be formed. Preferably the former should also be capable of being changed and is reusable.

According to one aspect of the present invention there is provided a modular component comprising an elongate hollow body having first and second attaching means for attaching the modular component to another modular component, the first attaching means being in the form of a cylindrical shaped spigot extending along an external surface of a first side wall of the body, the second attaching means being in the form of socket extending along an external surface of a second side wall of the body directly opposite the spigot and having an internal shape that is sized and of a complementary shape of the spigot for receiving a spigot of the another modular component, the socket being connected to the spigot by one or more bracing means that extend in a direction from the first side towards the second side between the spigot and the socket.

The cross sectional shape of the body extends in a direction mutually perpendicular to longitudinal axis of the body and to the axis of the body extending from the centroid of area of the spigot to the centroid of area of the socket. That is to say the body has a width that together with the strength of the structural member gives the modular component structural strength and integrity very much like that of a hollow beam. This is in contrast to existing similar constructions that are substantially planar, such as some modular fencing components or shutter doors referred to above. Giving the component thickness can greatly improve the structural strength of a curved surface formed of a plurality of components according to the present invention. It can also increase the rigidity of each component against flexion in the longitudinal plane extending from the centre of the first attaching means to the centre of the second attaching means.

The width W of the modular component measured between the centroid of area of the spigot and the centroid of area of the socket, together with the size and position of the cutaway section of the socket and the shape and construction of the body is a determining factor in the radius of curvature that can be formed from an assembly of components. Preferably the ratio of the width W of the cross sectional area of the body to a height H of the body measured normal to the width W of the body is in the range of between 1.8 to 1.00 and 2.2 to 1.00.

Preferably the spigot is mounted at the first side of the component by a first mounting portion that extends from a side of the spigot that faces the body, the socket comprises a cylindrical tube mounted at the second side of the component by a second mounting portion that extends from a side of the tube that faces the body, the tube has a cutaway section at an outer side, and the cylindrical tube is sized to allow a spigot of the another component to be slidably and securely mounted therein whilst allowing limited rotation of the spigot mounted therein about a longitudinal axis of the spigot, and the body is shaped and formed to allow the limited rotation of the component relative to the another components that is connected to the component by means of the spigot or socket.

Preferably the body has one or more end walls interconnected to the sidewalls. Preferably there are two spaced end walls interconnected to the sidewalls. Preferably the spigot and socket of the component are located in a plane lying intermediate the end walls, and the side walls tapered towards each end wall.

The one or more bracing means are preferably located inside the hollow body, but could be constituted by an external end wall of the body.

Preferably the body is shaped relative to the spigot and socket to allow limited rotation of the component when the component is attached to identical components by means of its first and second attaching means. Ideally the side walls taper towards at an end wall. In the case where the spigot and socket of the component are located in a plane lying intermediate the end walls, it is preferred that the side walls taper towards each end wall. These tapered sidewalls allow for limited rotational movement of the component when it is assembled in a socket of an adjoining component without fouling the adjacent component. In a preferred construction the body has a shape that comprises two substantially isosceles trapezoidal prisms each extending from a side of a longitudinal plane that extends from the centre of the spigot to the centre of the socket.

Preferably the body has a shape that comprises two substantially isosceles trapezoidal prisms each extending from a side of a longitudinal plane that extends from the centre of the spigot to the centre of the socket. It is preferred that the two prisms are substantially identical but they need not be. As will be readily understood, in an embodiment of the invention formed in this manner the acute angle of the trapezoidal prisms can define the degree of rotation that is possible for a pair of attached identical components. In order to limit appropriately the possible degree of rotation the acute angle of each isosceles trapezoidal prism may be between 80° and 89°. More preferably the acute angle of each isosceles trapezoidal prism may be 85°.

It is preferred that the spigot is a longitudinally extending cylinder and is mounted at the first side of the component by a first mounting portion that extends from an inner side of the spigot, the socket is a longitudinally extending cylindrical tube having a cutaway section at an outer side, and the socket is sized to allow a spigot of an another identical component to be slidably and securely mounted therein, and the cutaway section is sized to allow limited rotation of a spigot of the another component slidably mounted therein, the socket is connected to the body by a second mounting portion, the bracing member joins the first mounting portion to the second mounting portion, and the body of each component is dimensioned and shaped to allow limited rotation of the component about the longitudinal axis of the spigot when the component is attached to identical components by means of its spigot and socket.

The body of the component may be attached to the mounting portion and the socket in any position. In a preferred embodiment of the invention the body is longitudinally joined to the socket substantially at positions 90° around the socket from an inner side of the socket.

Preferably the spigot is a longitudinally extending cylinder and is mounted at the first side of the component by a first mounting portion that extends from an inner side of the spigot, the socket is a longitudinally extending cylindrical tube having a cutaway section at an outer side, and the socket is sized to allow a spigot of an another identical component to be slidably and securely mounted therein, and the cutaway section is sized to allow limited rotation of a spigot of the another component slidably mounted therein, the socket is connected to the body by a second mounting portion, the bracing web joins the first mounting portion to the second mounting portion, and the body of each component is dimensioned and shaped to allow limited rotation of the component about the longitudinal axis of the spigot when the component is attached to identical components by means of its spigot and socket.

Preferably the body has a shape that comprises two substantially isosceles trapezoidal prisms each extending from a side of a longitudinal plane that extends from the centre of the spigot to the centre of the socket. It is preferred that the two prisms are substantially identical but they need not be. As will be readily understood, in an embodiment of the invention formed in this manner the acute angle of the trapezoidal prisms can define the degree of rotation that is possible for a pair of attached identical components. In order to limit appropriately the possible degree of rotation the acute angle of each isosceles trapezoidal prism may be between 80° and 89°. More preferably the acute angle of each isosceles trapezoidal prism may be 85°.

Preferably the first and second mounting portions are substantially planar. The second mounting portion is preferably longitudinally joined to the tube substantially at a position 90° around the tube from an inner side of the tube.

Preferably the body has a semi-cylindrical portion that is longitudinally joined to the first mounting portion along its mid-point that defines a concave recess that faces the spigot and extends around an inner side of the spigot and is spaced from the spigot by a distance substantially equal to the thickness of a wall of the socket.

In a further embodiment the body has two spigots extending along the first sidewall and two sockets extending along the second sidewall.

The preferred method of construction of the component is one of extrusion of an extrudable material selected from a plastics material, a metal, a metal alloy, or an extrudable composites material. The metal may be aluminium or an aluminium alloy According to a further aspect of the present invention there is provided an assembly of a plurality of components that are assembled so as to be interconnected by means of their spigots engaging one or more sockets of one or more adjacent components.

If desired the components of the assembly may be of different lengths L, are assembled in rows by sliding the spigots of the components into the sockets of an adjoining one or more components, wherein the components in a first row are staggered along the sockets so that the components in the first row overlap the joins of adjacent components in a second row to form a tessellation of components.

Specifically, a plurality of identical modular components according to the present invention can be attached to one another in order to form an article that has a curved surface that can then be used as a former, template, or mould in order to form another material to a desired shape or as a structural component in its own right.

The body is formed to allow limited rotation of the component when the component is attached to identical components by means of its first and second attaching means. That is, the body is not a shape that would prevent the component being attached to identical components by means of its first and second attaching means. Furthermore, the body is a shape such that when the component is attached to identical components by means of its first and second attaching means limited rotation of the component relative to the attached identical component is allowed. As will be readily understood, this precludes any shape of body wherein the body would abut the body of an adjacent attached identical component on both sides of the longitudinal plane extending from the centre of the first attaching means to the centre of the second attaching means. The body must have a shape such that in any rotational position the body either does not abut an adjacent attached identical component at all or only abuts the attached component only on one side of the longitudinal plane extending from the centre of the first attaching means to the centre of the second attaching means. In fact, the limited degree of rotation that is allowed by a body may be defined by the degree of rotation a component can undergo from a position where the body abuts a body of an adjacent attached identical component on a first side of the longitudinal plane extending from the centre of the first attaching means to the centre of the second attaching means to a position where the body abuts the body of the adjacent attached identical component on a second side of longitudinal plane extending from the centre of the first attaching means to the centre of the second attaching means. In some embodiments of the invention, this is the limiting factor for the maximum radius of curvature that can be formed in a curved surface formed of a plurality of identical modular components according to the present invention. However, in other embodiments of the present invention the size of the cutaway section may be the limiting factor and prevent any abutment of body s of adjacent identical attached modular components.

The modular component of the present invention is advantageous as curved profiles can be formed quickly and easily without the need for any difficult forming processes. Specifically, curved profiles can be formed by simply sliding a suitable number of suitably sized modular components together and positioning the components in the correct manner. If the curved profile is used to form a curve in another material, after the curved profile has been used either the surface can be formed to another different curve or the modular components can be separated and stored until it is necessary to use them again.

The body of a component according to the present invention is hollow in order to reduce the cost and weight of a component. However the body could be a solid body.

The body may extend from only one side of the transverse plane extending from the centre of the first attaching means to the centre of the second attaching means. However, it is more preferable that the body extends outwards from both sides of the transverse plane extending from the centre of the spigot to the centre of the socket.

Preferably the body will comprise a flat end surface that is substantially parallel to, and at a distance from, the transverse plane extending from the centre of the spigot to the centre of the socket.

Even more preferably, the body will comprise a first flat end surface that is substantially parallel to, and at a distance from, a first side of the transverse plane extending from the centre of the spigot to the centre of the socket, a second flat end surface that is substantially parallel to, and at a distance from, a second side of the said transverse plane.

It is preferable that the body comprises at least one, and preferably two, such flat end surfaces as these surfaces can form the facets of a curved profile defined by a plurality of interconnected identical modular components. Forming curved profiles from a plurality of substantially flat surfaces is advantageous in that it makes the curved profile smoother and more suitable for the possible uses discussed above.

The distance of any flat end surface from the transverse plane extending from the centre of the spigot to the centre of the socket may be substantial and in preferred embodiments of the invention may be greater than, or equal to, half the width W of the component.

As will be readily understood, if the component comprises one or two flat end walls it is preferable that one or both end walls have a width perpendicular to the longitudinal direction L of the component that is as large as possible within the constraints of the shape of the body discussed above. Preferably, the width of one or both end surfaces will be between 50 and 80% of the width W of the component.

In a preferred embodiment of the invention the body has a shape that comprises two substantially isosceles trapezoidal prisms each extending from a side of the longitudinal plane extending from the centre of the first attaching means to the centre of the second attaching means. Specifically, the flat surfaces of the trapezoidal prism are parallel to the transverse plane extending from the centre of the spigot to the centre of the socket, the wider of the flat surfaces of each trapezoidal prism is located substantially at the said transverse plane and the narrower of the flat surfaces of each trapezoidal prism is at a distance from said transverse plane.

It is advantageous that the body incorporates a semi-cylindrical tubular section that is longitudinally joined to the mounting portion along its mid-point, and extends around an inner half of the spigot but is separated from the spigot by a distance substantially equal to the thickness of a wall of the socket. That is, a corner of the trapezoidal shape adjacent the spigot has a curved portion that extends around but is separated from the first spigot. This structure allows the spigot to be slidably and rotatably mounted within the socket of an identical component whilst also providing the most robust and secure construction of the component and a similarly robust mounting of the spigot.

The mounting portion of a component according to the present invention may have any suitable shape. However, it may be preferable that the mounting portion is substantially planar.

Preferably, a modular component according to the present invention will be longitudinally uniform. However, it is to be understood that a component according to the present invention may have small variations along its longitudinal length. For example, one or both of the spigot or socket may not be continuous along the entire longitudinal length of the component.

It may be preferable that a component according to the present invention is formed by extrusion. However, any suitable forming method may be used to make a component and it may be formed of any suitable material. For example, a component may be formed of a rigid plastic material, steel, or aluminium or of a composite material. If a component is formed of steel it may be preferable that it is formed of stainless steel.

BRIEF DESCRIPTION OF THE DRAWINGS

The invention will now be described by way of examples and with reference to the accompanying drawings in which FIG. 1 is an isometric projection of a single modular component according to a preferred embodiment of the present invention;

FIG. 2 is a cross-section through the modular component of FIG. 1;

DETAILED DESCRIPTION OF THE INVENTION

Figure 3:
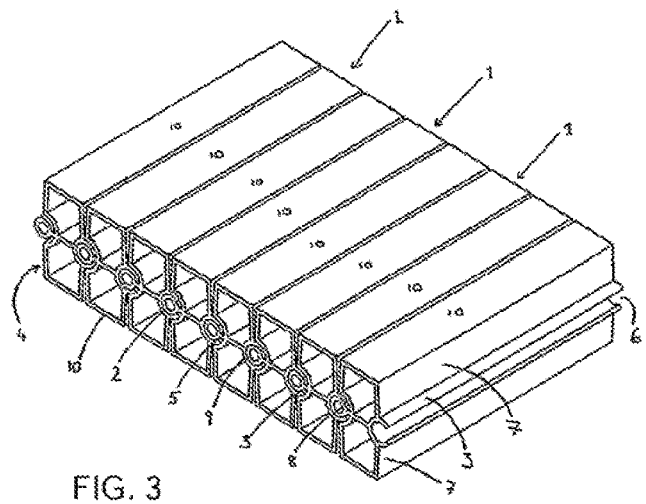
FIG. 3 is an isometric projection of a plurality of modular components according to the preferred embodiment of the invention joined together.
Figure 5:
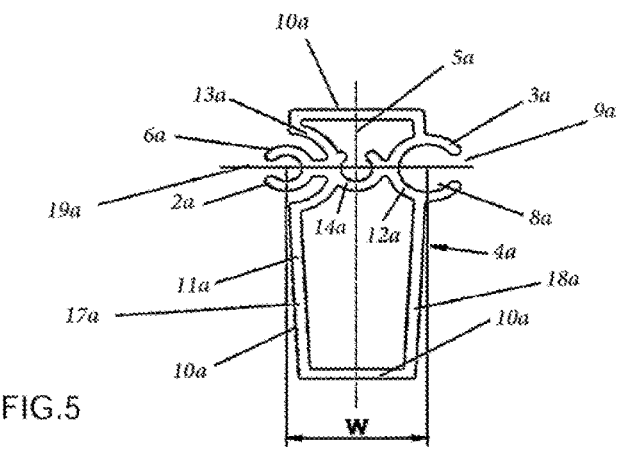
FIGS. 5 to 8 show further modular components constructed in accordance with the present invention.
Figure 6:
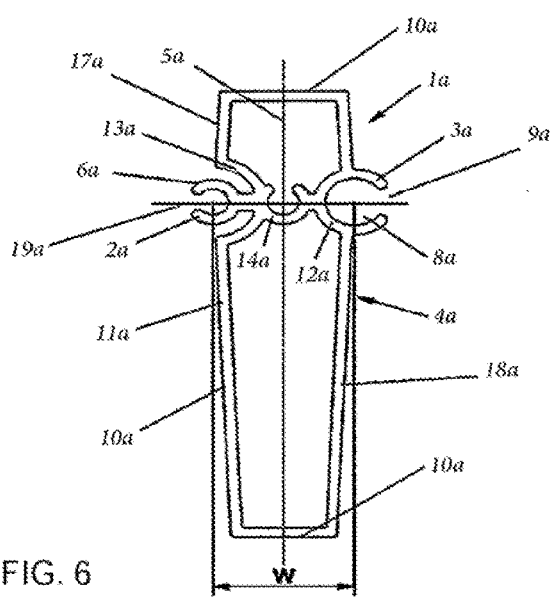

A preferred embodiment of a component 1 according to the present invention is shown in FIGS. 1 to 4. The modular component 1 comprises an elongate hollow body 4 having two side walls 17 and 18 and two end walls 10. A first attaching means 2 extends along the first side wall 17 of the body 4, and a second attaching means 3 extends along the second side wall 18 of the body 4 for connecting a first component 1 to an identical second modular component 1 as explained below. The component 1 is preferably made by extruding an extrudable material (but could be cast or moulded) and extends longitudinally, and, as can be seen best in FIGS. 1 and 2, has a symmetrical shape about a central plane 19 (see FIG. 2) extending along its length L.

The first attaching means 2 comprises a longitudinally extending cylindrical spigot 6 and is attached to the body 4 by a mounting portion 7. The mounting portion 7 is substantially planar and is attached to the spigot 6 at a first end and to the body 4 at a second end of the mounting 7.

The second attaching means 3 comprises a longitudinally extending cylindrical socket 8 the internal shape of which is sized and of a complementary shape to the external diameter of the spigot 6 for receiving a spigot 6 of second identical component 1. In other words, the inner diameter of the socket 8 is substantially equal to an outer diameter of the spigot 6 of the first attaching means 2.

The socket 8 has a cutaway section 9 at an outer facing side that faces away from the body of the component. The cutaway section 9 extends approximately 45° around the socket 8 and is centred on the midpoint transverse axis 15 of the component 1 that lies orthogonal to the plane 5. This cutaway section 9 allows the spigot 6 of a first component 1 to be slidably and rotatably mounted within the socket 8 of a second component 1 in the manner shown in FIGS. 3 and 4.

The body 4 comprises two substantially isosceles trapezoidal prisms 11 that together form the side walls 17 and 18 and end walls 10 of the body 4. The two prisms 11 are symmetrical images of one another about the transverse axis 19 of the component 1. Although substantially isosceles trapezoidal prisms, each prism 11 includes two curved sections 12 and 13. The curved sections 12 define part of a wall of the socket 8 whilst the two curved sections 13 define an outwardly facing concave recess that faces towards, and is spaced from, the spigot 6 and therefore each section 13 is an approximately 90° sector of a longitudinally extending tubular cylinder. Each curved section 13 extends around, but is spaced from, approximately 90° of the circumference of the spigot 6 so that the two sections 13 encompass approximately 180° of the circumference of the spigot 6.

The inner radius of each curved section 12 defines a concave second recess that is substantially equal to the outer radius of the wall of the socket 8. As the outer radius of the spigot 6 is substantially equal to the inner radius of the socket 8, the separation of each first curved section 12 from the spigot 6 is substantially equal to the thickness of the wall of the socket 8. This allows the socket 8 to be slidably and rotatably mounted around the spigot 6 of a second component 1 and within the concave recess defined by the curved section 12 as shown in FIGS. 1 and 2.

The mutually common wall of the prisms 11 constitutes a bracing structural member 14 that interconnects the spigot 6 (through the mounting portion 7) to the socket 8.

Figure 4:
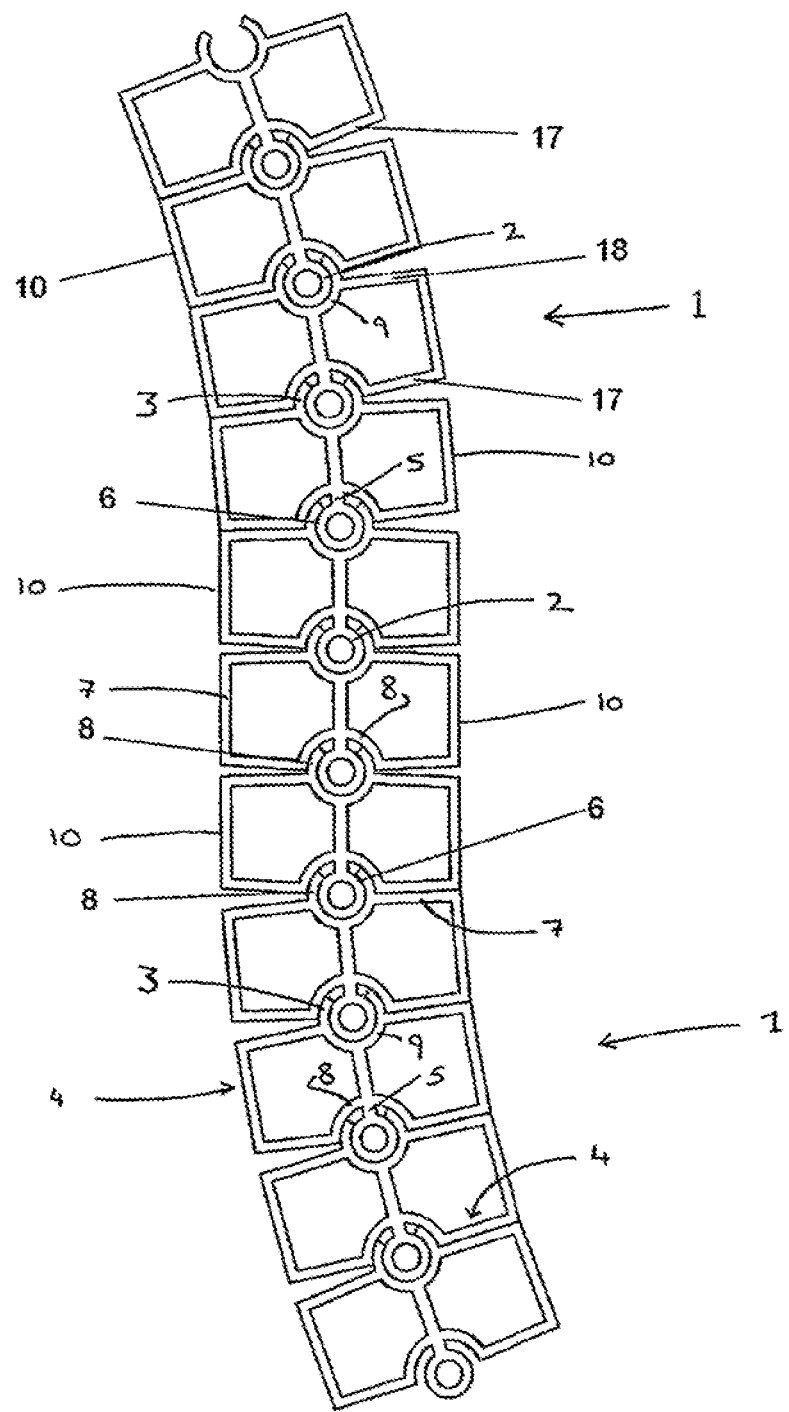
FIG. 4 is a cross-section through a plurality of modular components according to the preferred embodiment of the present invention that are joined together.

The acute angle of each isosceles trapezoidal prism 11 is in the range of 81° to 89°, and is preferably 0.85°. This allows approximately 10° of rotation between adjacent connected components 1 about the centroid of area of the spigot 8 when the components 1 are connected together from a straight line position or flat profile, as shown in FIG. 3, to a curved profile, as shown in FIG. 4. As each component 1 can be rotated 10° about the centroid of area of the spigot 6 away from a straight line position in either direction, the maximum degree of rotation of two connected components is 20°. Adjacent components 1 cannot be rotated any more than this, as the bodies 4 of the components 1 are brought into contact with one another and prevent any further rotation. In this manner, it is the acute angle of each prism 11 that defines the maximum degree of rotation about the longitudinal central axis of the spigot 6.

Due to the shape of the body 4, the component 1 has two flat end walls 10. These flat end walls 10 define flat facets of the curved profile shown in FIG. 4 when the component 1 is attached to a plurality of identical components 1 in the manner shown in FIGS. 3 and 4. Although it is preferred that the end walls 10 are flat, if desired they could be formed with an outwardly facing convex or concave curvature (not shown) corresponding to the curvature of the profile defined by an assembly of a plurality of interconnected components 1. The attached components 1 can be easily manually rotated relative to one another to form various profiles with various radii of curvature, as shown in FIG. 4.

The component 1 of the preferred embodiment is formed of extruded metal such as a aluminium, aluminium alloy, or another extrudable metal, but could be made of an extrudable plastics material, and, as such, is suitable for use either as a former for forming curved wooden or plastic panels, or as a structural member in a building. Alternatively, for shorter lengths of component 1 the components 1 could be die cast or possibly moulded, but the preferred manufacturing process is one of extrusion.

The components 1 shown in the FIGS. 1 to 4 are effectively structural hollow beams that have a width W (see FIG. 2) measured in a direction along a transverse plane 18 extending through the structural member 14, and measured from the centre of the spigot 6 to the centre of the socket 8 of approximately 25 mm. The components 1 have a height H measured in a direction perpendicular to the width W of approximately 35 mm. However, as the component 1 is an extruded product, it can be provided in any suitable length L.

Since the components 1 of FIGS. 1 and 2 comprise one or two flat end walls 10 it is preferable that one or both of the end walls 10 have a width perpendicular to the longitudinal direction L of the component 1 that is as large as possible within the constraints of the shape of the body 4. Preferably, the width of one or both end walls 10 will be between 50 and 80% of the width W of the component.

The distance of any flat end wall 10 from the transverse plane extending from the centre of the spigot to the centre of the socket may be substantial and in preferred embodiments of the invention may be greater than, or equal to, half the width W of the component.

Referring to FIGS. 5 to 8 there are shown different shapes of modular components incorporating the present invention. All of the designs of body 4 incorporate an internal bracing structural member 14 extending between each the spigot 6 and each socket 8. As will be seen from FIGS. 5 and 6, the structural member 14*a* can be positioned at various intermediate locations between the ends 10*a* of the body 4*a*.

Figure 7:
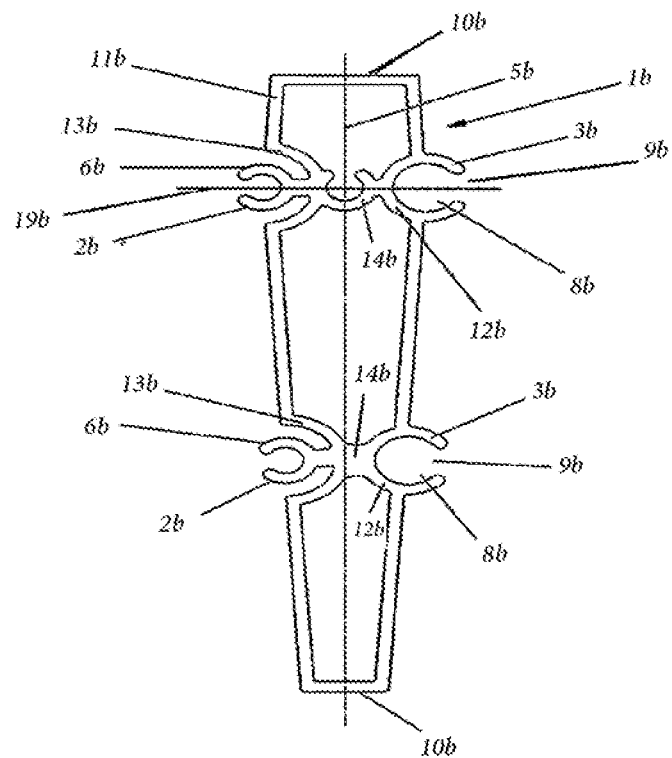

Referring to FIG. 7 there is shown a further embodiment of the present invention where each body 4*b* of each component 1*b* is provided with two spigots 6*b* on a first side wall of the body 4*b* and two sockets 8*b* on an opposite second side wall of the body 4*b*. In a further embodiment (not shown) of the version of component 1*b* shown in FIG. 7, the body 4*b'* has one spigot 6*b'* and one socket 8*b'* on a first side wall 18*b'* of the body 4*b'* (instead of two spigots 6*b'*) and one spigot 6*b'* and one socket 8*b* on a second side wall 19*b'* of the body (instead of two sockets 8*b'*). These latter mentioned designs of modular component 1*b'* would not have the same flexibility in defining different shapes of curved surface as those of FIGS. 1 to 7 because it is not possible to rotate the spigots 6*b'* of one component 1*b'* in the sockets 8*b'* of an adjoining component. However, it may be feasible for structures that do not require this flexibility.

A common and important feature of all of components 1, 1*a*, or 1*b* of FIGS. 1 to 7 is that they incorporate a structural member 14, 14*a*, or 14*b* that acts as a strut or as a tie to keep the side walls of the hollow body 4, 4*a*, or 4*b* rigid when the component 1, 1*a*, or 1*b* is exposed to external forces on the spigots 6, 6*a*, or 6*b* and sockets 8, 8*a*, or 8*b* by adjoining components 1, 1*a*, or 1*b*.

Referring to FIGS. 1 to 7 the modular components 1, 1*a*, or 1*b* can be assembled with identical components 1, 1*a*, or 1*b* by sliding their spigots into sockets of adjacent components 1, 1*a*, or 1*b* to define a structure that has a curved profile. The structure so formed may be used as a structural component in its own right, or as a temporary, reusable, (or permanent) former, mould, or support, for the manufacture of other articles or materials that are made by laying up laminated materials, or depositing settable materials on the profile defined by the assembled components 1, 1*a*, or 1*b*. In the latter instance, curved furniture (for example a chair back and seat) could be made by laying up or forming various laminated pre-glued materials on to a temporary reusable former, mould, or support made up of a plurality of interconnected components 1, 1*a*, or 1*b*, and holding the laminated materials in place until the glue is set.

In the above examples, components 1, 1*a*, or 1*b* of similar lengths are used to make up a former or structure of even length. It is to be understood that the spigots 6, 6*a*, or 6*b* of two or more components 1, 1*a*, or 1*b* of various lengths, L, can be laid end to end (so that their end faces 10, 10*a*, or 10*b* and confront each other) in rows, then two or more components 1, 1*a*, or 1*b* are inserted into a common socket or sockets 8, 8*a*, or 8*b* of an adjoining second row of components 1, 1*a*, or 1*b* and positioned to overlap the joins between the confronting end faces 10, 10*a*, or 10*b* of the adjacent row of components 1, 1*a*, or 1*b*. In this way a tessellation of components (very much like the pattern of bricks in a brick wall) can be constructed that extend the overall length and width of the structure formed by the interconnected components 1, 1*a*, or 1*b*.

Figure 9:
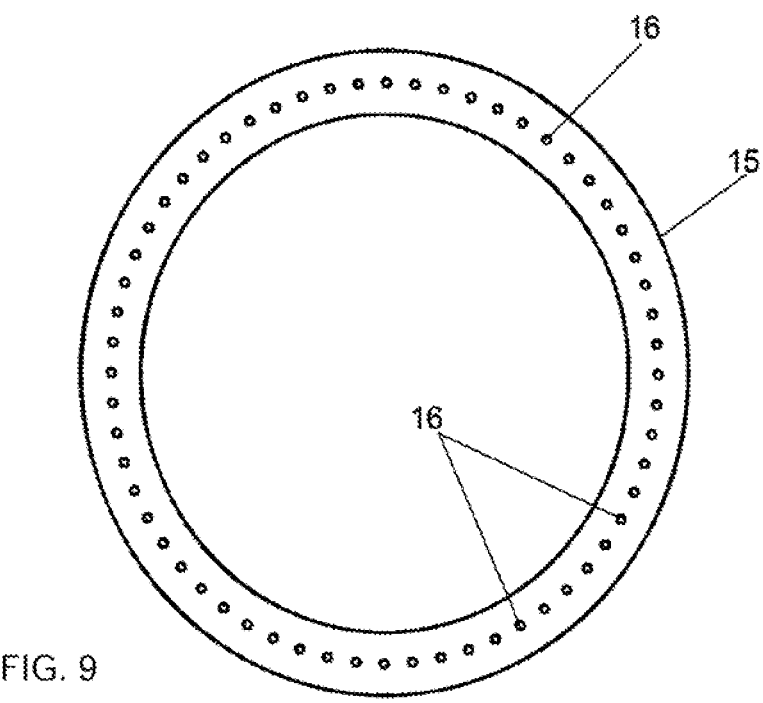
FIGS. 9 to 11 show various end plates for holding two or more assembled components in a fixed relationship.
Figure 10:
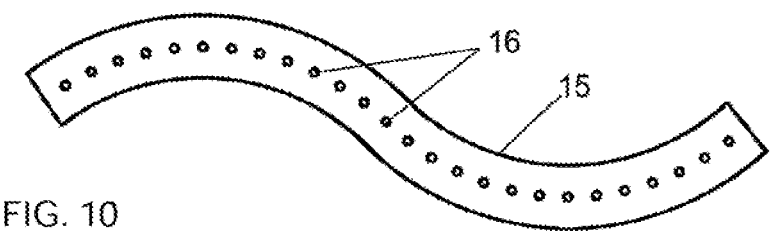
Figure 11:
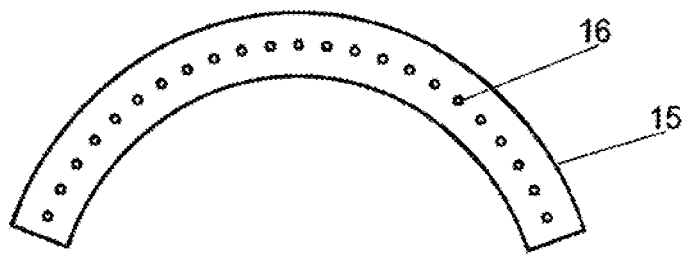

Referring to FIGS. 9 to 11 there is shown a number of end plates 15 which, when used with a plurality of interconnected components 1 hold the assembled components 1 in a desired fixed relationship one with another. The end plates 15 can be a permanent part of the final structure formed by the interconnected components 1, or can be a temporary part of the final structure that is removed from the components 1 to enable the components 1 to be disassembled and reused. The end plates 15 are shaped to define a desired profile such as a cylinder (FIG. 9), or wavy pattern (FIG. 10), or a curved surface (FIG. 11) and have holes 16 at predefined positions that correspond to fixing locations 17 on each of the components 1 that are to be held together by the end plates 15. Screws (not shown) are inserted into the holes 16 and screwed into the fixing locations 17 to hold the components in place.

Figure 8:
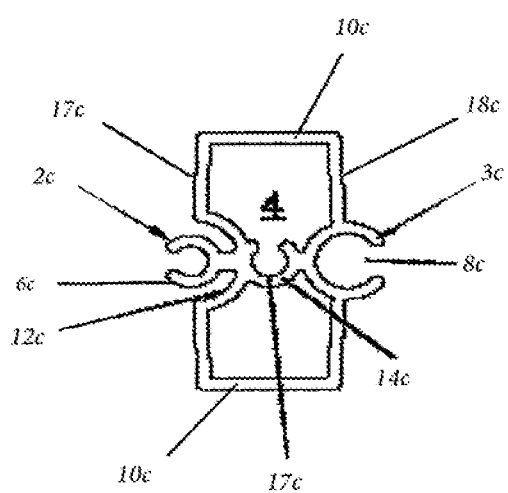

The fixing locations 17 could be constituted by the ends of the spigots 6 so that the screws are screwed into each spigot 6. However, it is preferred to provide separate fixing locations 17 that are formed on the structural members 14. Referring to FIG. 8 the fixing locations 17 are formed by extruding a cylindrical rib along the length of the structural member 14 of each component 1.

In use of the present invention as a former for making for example a laminated wooden item that has curved shape, a first former is made from a plurality of components 1 that are of the same length connected together as a flat sheet that is then and bent into a curved shape and fixed to on to a suitable support (which may be made of wood, plastics, or metal). Glue is applied to the confronting faces of laminate wood sheets and the laminate layers are laid up on to the first former. A second former made up of a plurality of components 1 connected together as described above is placed on top of the laminated wood layers The second former together with the plywood structure is bent so as to wrap the laminated wood layers and the second former around the outside of the first former by means of tensionable straps that wrap around the outside of the second former so that the laminated layer of unglued wood is sandwiched between the two formers. The whole assembly is then held in place to permit the glue to set to form a wooden curved product. Thereafter the two formers are separated from the wooden structure and can be reused.

In an alternative use of the invention as a former for making curved wooden articles, the end plates 15 can be used as the support for the components 1 that make up the first and second formers. It is possible to make the body 4 of a triangular cross-sectional shape by effectively eliminating one of the end walls 10.

The invention claimed is:
1. A modular construction tool for forming curved shapes, comprising:
one or more elongate bodies each defining a longitudinal axis and a front shaping face, each elongate body having:

first and second attachments extending along the longitudinal axis on directly opposed first and second side walls of the elongate body, on opposite sides of the front shaping face, for successively linking elongate bodies one to another;

the first attachment including a cylindrically shaped spigot extending along the longitudinal axis and attached to an external surface of the first side wall of the elongate body by a support, the spigot having a cross sectional shape forming a complete circumference of a cylinder; and the second attachment including a socket extending along the longitudinal axis and forming a partial circumference of a cylinder disposed along an external surface of the second side wall of the elongate body, the socket sized to receive a spigot of another elongate body, the partial circumference forming an opening through which the support is movable to enable pivoting of the spigot within the socket so as to enable successively linked elongate bodies to form an angle relative to each other, wherein the support extends in a direction from the first side wall towards the second side wall between the spigot and socket such that the support connects the spigot and socket, each elongate body has a symmetrical shape about a central plane extending along its length, and each elongate body is substantially uniform along its entire longitudinal length.

2. The tool of claim 1, wherein each elongate body is a structurally rigid hollow body that has two spaced end walls interconnected to the first and second sidewalls.

3. The tool of claim 2, wherein the first and second sidewalls taper towards the two spaced end walls.

4. The tool of claim 1, wherein each elongate body has a shape comprising two isosceles trapezoidal prisms each extending from a side of a longitudinal plane that extends from a center of the spigot to a center of the socket, the two prisms being symmetrical images of one another about the central plane extending along the length of the elongate body.

5. The tool of claim 4, wherein an acute angle of each isosceles trapezoidal prism is between 80° and 89°.

6. The tool of claim 1, wherein each elongate body has a semi-cylindrical portion that is longitudinally joined to the support along its mid-point that defines a concave recess that faces the spigot and extends around an inner side of the spigot and is spaced from the spigot by a distance equal to a thickness of a wall of the socket, the concave recess being continuous along the entire longitudinal length of the elongate body.

7. The tool of claim 1, wherein each elongate body comprises two spigots extending along the first sidewall and two sockets extending along the second sidewall.

8. The tool of claim 1, wherein a width between the first and second side walls is between 50 and 80% of a depth between opposed end walls transverse to the first and second side walls.

9. The tool of claim 1, wherein a ratio of height between a first end wall and a second end wall and width between the first and second side walls is less than or equal to 2.2 to 1.00.

10. The tool of claim 1,
wherein each elongate body has first and second spaced end walls interconnected to the first and second sidewalls, and
the length of each elongate body is greater than a height between its first and second end walls.

11. A modular construction tool for forming curved shapes, comprising:
a plurality of elongate bodies each defining a longitudinal axis, a front shaping face, and a rear face opposite the front shaping face, each elongate body having:
first and second attachments extending along the longitudinal axis on directly opposed first and second side walls of the elongate body, on opposite sides of the front shaping face, for successively linking elongate bodies one to another;
the first attachment including a longitudinally extending support attached to an external surface of the first side wall, and a shaft extending along the longitudinal axis and attached to the longitudinally extending support, the shaft having a cross sectional shape forming a complete circumference of a cylinder;
the second attachment including a socket extending along the longitudinal axis and forming a partial circumference of a cylinder, the socket sized to receive a shaft of another elongate body, the partial circumference forming an opening through which the longitudinally extending support is movable to enable a pivoting of the shaft within the socket so as to enable successively linked elongate bodies to form an angle relative to each other; and
a ratio of height between the front shaping and the rear faces and width between the first and second side walls is in a range of between 1.8 to 1.00 and 2.2 to 1.00,
wherein a brace extends through an interior of each elongate body and connects the longitudinally extending support and the socket, and
each of the elongate bodies has a symmetrical shape about a central plane extending along its length.

12. The tool of claim 11, wherein the tool is a curved mould or former, the curved mould or former being formed by an assembly of the plurality of elongate bodies of the tool, the elongate bodies being interconnected by their shafts engaging one or more sockets of one or more adjacent elongate bodies, and the elongate bodies being fixed to one or more supports.

13. The assembly according to claim 12, further including end plates that are secured to the elongate bodies to hold the elongate bodies in a predetermined curved profile.

14. The tool of claim 11, wherein the brace includes a curved portion.

15. The tool of claim 11, wherein the first and second sidewalls taper towards at least one of the rear faces.

16. The tool of claim 11, wherein each elongate body comprises two shafts extending along the first sidewall and two sockets extending along the second sidewall.

17. A modular tool for forming a template for constructing a curved surface, comprising:
a plurality of elongate bodies each defining a longitudinal axis, each having a longitudinally extending front face forming a section of the template of the curved surface, and first and second side walls adjacent the front face on directly opposite sides of the front face, and each having:
a first attachment including:
a first socket formed as a partial circumference of a cylinder;
a longitudinally extending support attached to an external surface of the first side wall within the first socket; and
a shaft extending along the longitudinal axis and attached to the longitudinally extending support to extend coaxially with the first socket along the longitudinal axis, the shaft having a cross sectional shape forming a complete circumference of a cylinder; and a second attachment including:

a second socket extending along the longitudinal axis and forming a partial circumference of a cylinder disposed partially beneath a surface of the second side wall, wherein a part of the partial circumference extends above the surface of the second side wall to form opposed cylindrical wall sections each having a thickness, an interior of the second socket is sized to receive a shaft of another elongate body, and the partial circumference forms an opening through which the longitudinally extending support is movable to enable pivoting of the shaft within the second socket so as to enable successively linked elongate bodies to form an angle relative to each other, wherein each of the plurality of elongate bodies has a symmetrical shape about a central plane extending along its length, and each of the plurality of elongate bodies is substantially uniform along its entire longitudinal length.

18. The tool of claim 17, wherein the thickness of each of the opposed cylindrical wall sections corresponds to a distance between an exterior surface of the shaft and an interior surface of the first socket.

19. The tool of claim 17, further comprising a brace extending through an interior of each of the plurality of elongate bodies and connecting the longitudinally extending support and the second socket.

20. The tool of claim 17, wherein the first and second side walls taper towards the front face.

* * * * *